(12) United States Patent
Badidi

(10) Patent No.: US 12,044,137 B2
(45) Date of Patent: Jul. 23, 2024

(54) LUBRICATION MODULE FOR A TURBOMACHINE LUBRICATION STATION

(71) Applicant: SAFRAN TRANSMISSION SYSTEMS, Colombes (FR)

(72) Inventor: Abdallah Badidi, Moissy-Cramayel (FR)

(73) Assignee: SAFRAN TRANSMISSION SYSTEMS, Colombes (FR)

(*) Notice: Subject to any disclaimer, the term of this patent is extended or adjusted under 35 U.S.C. 154(b) by 0 days.

(21) Appl. No.: 18/336,674

(22) Filed: Jun. 16, 2023

(65) Prior Publication Data
US 2023/0407765 A1   Dec. 21, 2023

(30) Foreign Application Priority Data
Jun. 17, 2022 (FR) ........................... 2205930

(51) Int. Cl.
*F01D 25/20* (2006.01)
*F02C 7/06* (2006.01)
(Continued)

(52) U.S. Cl.
CPC ............ *F01D 25/20* (2013.01); *F02C 7/06* (2013.01); *F02C 7/32* (2013.01); *F16N 13/04* (2013.01);
(Continued)

(58) Field of Classification Search
CPC . F01D 25/20; F01D 25/18; F02C 7/06; F16N 7/40; F16N 2210/02; F16N 29/02;
(Continued)

(56) References Cited

U.S. PATENT DOCUMENTS 2,071,913 A * 2/1937 Bentley .................. F16N 13/20
                                                                184/6.28
2,642,155 A * 6/1953 Wilhelm, Jr. ........... F01D 25/20
                                                                184/6.13
(Continued)

FOREIGN PATENT DOCUMENTS

FR    2817912 A1    6/2002
FR    3020410 A1    10/2015
FR    3104208 A1    6/2021

OTHER PUBLICATIONS

French Search Report issued in French Application No. 22 05930, mailed on Jan. 23, 2023.

*Primary Examiner* — Henry Y Liu
(74) *Attorney, Agent, or Firm* — Bookoff McAndrews, PLLC

(57) ABSTRACT

Lubrication module for at least one lubrication station of a turbomachine, the lubrication module comprising at least one positive displacement pump including a pump body delimiting a main chamber configured to be in fluid communication with a main lubrication circuit and an auxiliary chamber configured to be in fluid communication with an auxiliary lubrication circuit, and a piston movably mounted in the pump body between an inactive configuration and an active configuration, the piston being configured to perform, in the active configuration, a pumping movement between a top dead center and a bottom dead center by cooperation with a cam of a shaft of the turbomachine and, in the inactive configuration, not to cooperate with the cam of the shaft of the turbomachine, the positive displacement pump including a return element configured to return the piston to the active configuration.

14 Claims, 5 Drawing Sheets

(51) Int. Cl.
*F02C 7/32* (2006.01)
*F16N 13/04* (2006.01)

(52) U.S. Cl.
CPC .... *F05D 2220/323* (2013.01); *F05D 2260/98* (2013.01); *F16N 2210/02* (2013.01); *F16N 2210/08* (2013.01)

(58) Field of Classification Search
CPC .. F16N 13/04; F16N 2210/16; F16N 2270/20; F01M 1/02
USPC ........................................................ 184/6.11
See application file for complete search history.

(56) References Cited

U.S. PATENT DOCUMENTS

| | | | | |
|---|---|---|---|---|
| 2,672,010 A * | 3/1954 | Newcomb | F01D 25/20 | 184/6.13 |
| 3,130,817 A * | 4/1964 | Wahlmark | F01B 3/0044 | 184/6.28 |
| 3,443,376 A * | 5/1969 | Light | G01L 3/1464 | 60/602 |
| 3,976,165 A * | 8/1976 | Pilarczyk | F01D 25/186 | 415/110 |
| 4,284,174 A * | 8/1981 | Salvana | F16C 19/52 | 60/39.08 |
| 4,891,934 A * | 1/1990 | Huelster | F01D 25/20 | 60/39.08 |
| 4,938,316 A * | 7/1990 | Ichikawa | F04C 14/06 | 184/27.2 |
| 5,196,746 A * | 3/1993 | McCabria | H02K 9/24 | 310/58 |
| 7,118,336 B2 * | 10/2006 | Waddleton | F02C 7/32 | 184/6.12 |
| 8,714,309 B2 * | 5/2014 | Carothers | F16N 13/04 | 184/6.1 |
| 9,151,444 B2 * | 10/2015 | Powell | F16N 25/02 | |
| 10,550,997 B2 * | 2/2020 | Powell | F04B 53/166 | |
| 11,261,946 B2 * | 3/2022 | O'Neill | F16H 53/02 | |
| 11,572,805 B2 * | 2/2023 | Maguire | F02C 7/06 | |
| 11,619,168 B2 * | 4/2023 | Davies | F01D 25/20 | 415/175 |
| 11,732,646 B2 * | 8/2023 | Gauthier | F01D 25/18 | 184/6.11 |
| 2005/0135929 A1 * | 6/2005 | Waddleton | B64C 11/38 | 416/1 |
| 2011/0308888 A1 * | 12/2011 | Carothers | F16N 7/38 | 184/6.1 |
| 2015/0129064 A1 * | 5/2015 | Reilly | B01F 35/833 | 137/605 |
| 2017/0022906 A1 * | 1/2017 | Lepage | F02C 7/232 | |
| 2017/0122330 A1 * | 5/2017 | Mastro | F04D 25/045 | |
| 2017/0198605 A1 * | 7/2017 | Vielcanet | B64C 11/308 | |
| 2018/0023564 A1 * | 1/2018 | Naganuma | F04C 15/008 | 417/364 |
| 2018/0087492 A1 * | 3/2018 | Powell | F04B 1/07 | |
| 2018/0187676 A1 * | 7/2018 | Saga | F04C 2/3441 | |
| 2018/0223840 A1 * | 8/2018 | Naganuma | F04C 2/344 | |
| 2019/0017596 A1 * | 1/2019 | Senbongi | F04C 14/226 | |
| 2019/0345852 A1 * | 11/2019 | Kato | F16F 15/264 | |
| 2020/0018198 A1 * | 1/2020 | Kitamura | F16C 33/105 | |
| 2020/0063838 A1 * | 2/2020 | O'Neill | F02B 75/32 | |
| 2020/0191054 A1 * | 6/2020 | Parnin | F01D 25/20 | |
| 2020/0200043 A1 * | 6/2020 | Parnin | F02C 7/06 | |
| 2021/0024070 A1 * | 1/2021 | Honda | B60W 30/184 | |
| 2021/0156280 A1 * | 5/2021 | Gebhard | F01D 25/20 | |
| 2021/0189922 A1 * | 6/2021 | Kurita | F04C 2/3442 | |
| 2021/0246811 A1 * | 8/2021 | Maguire | F02C 7/06 | |
| 2021/0332754 A1 * | 10/2021 | Davies | F02C 7/06 | |
| 2021/0381405 A1 * | 12/2021 | Saga | F01M 1/02 | |
| 2023/0012413 A1 * | 1/2023 | Gauthier | F01D 25/18 | |

* cited by examiner

[Fig. 1]
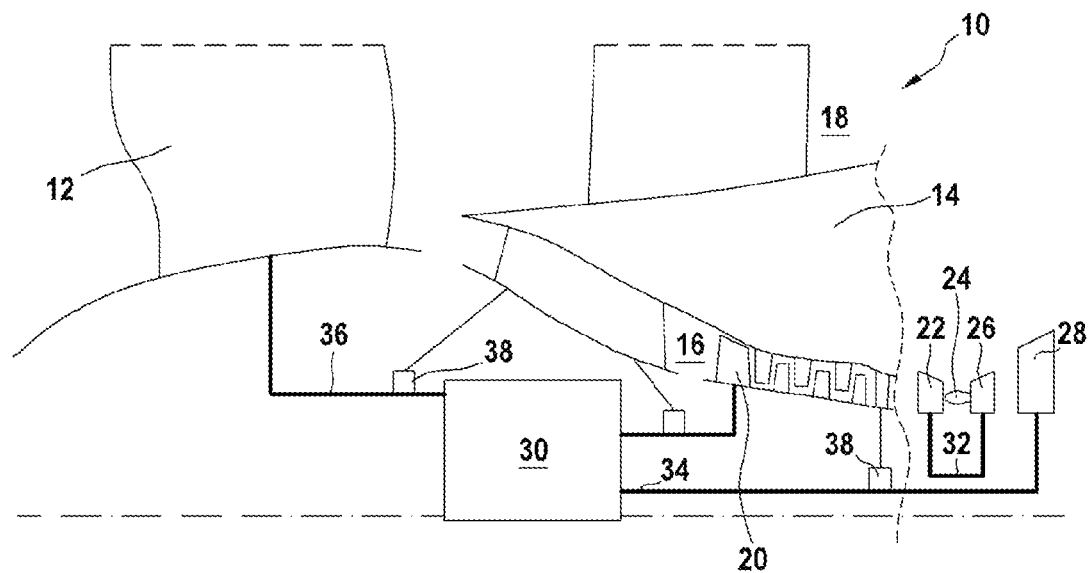
[Fig. 2]
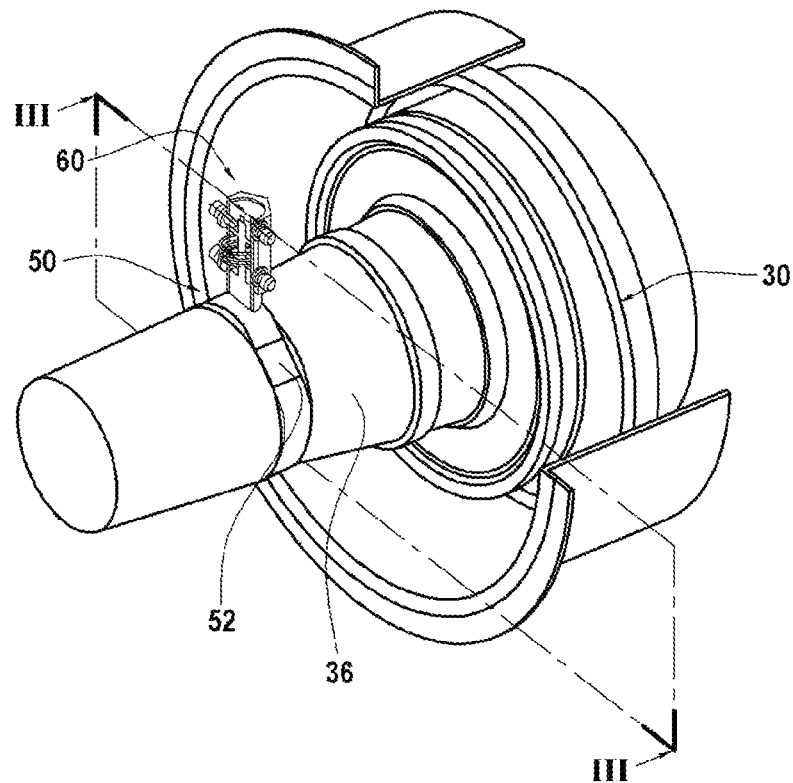

[Fig. 3]
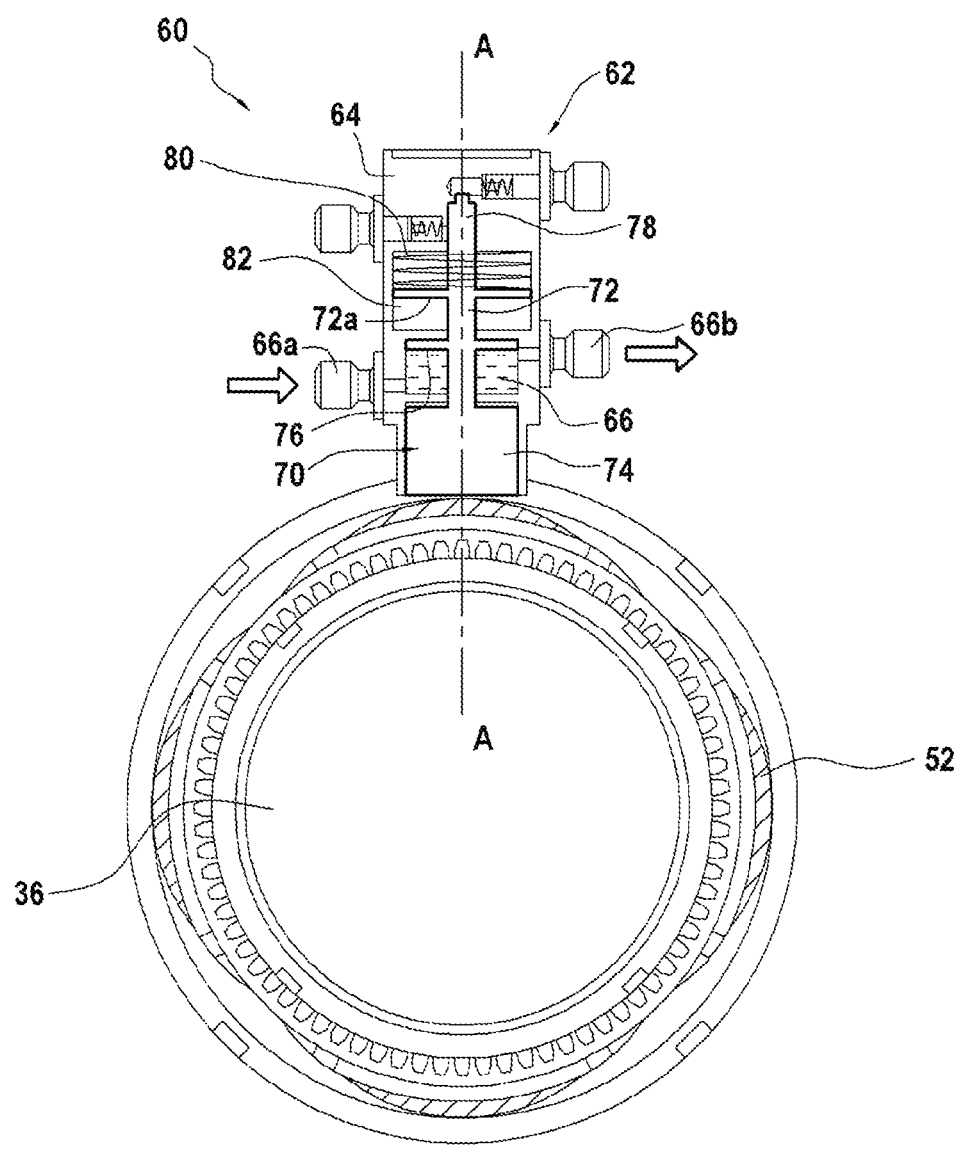

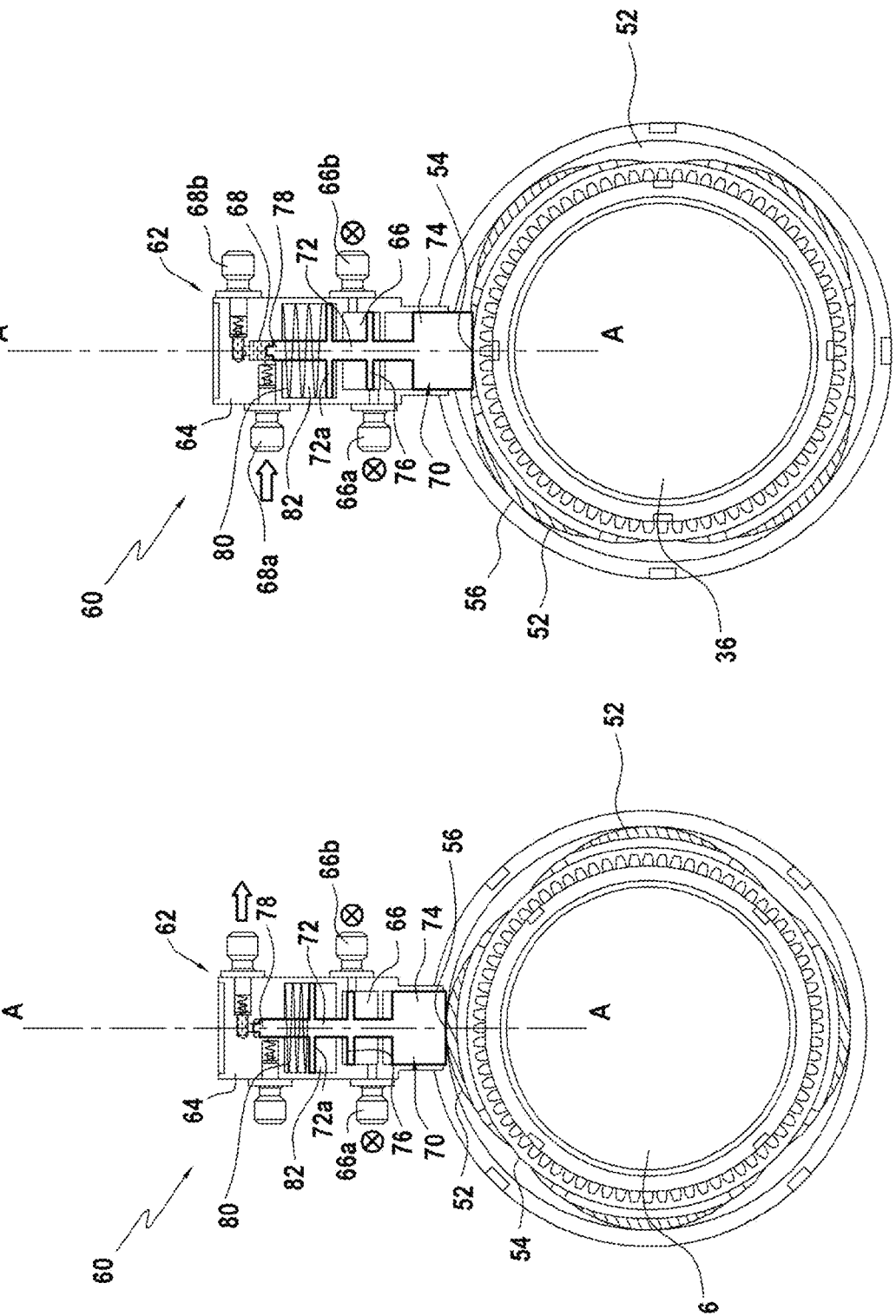

[Fig. 6]
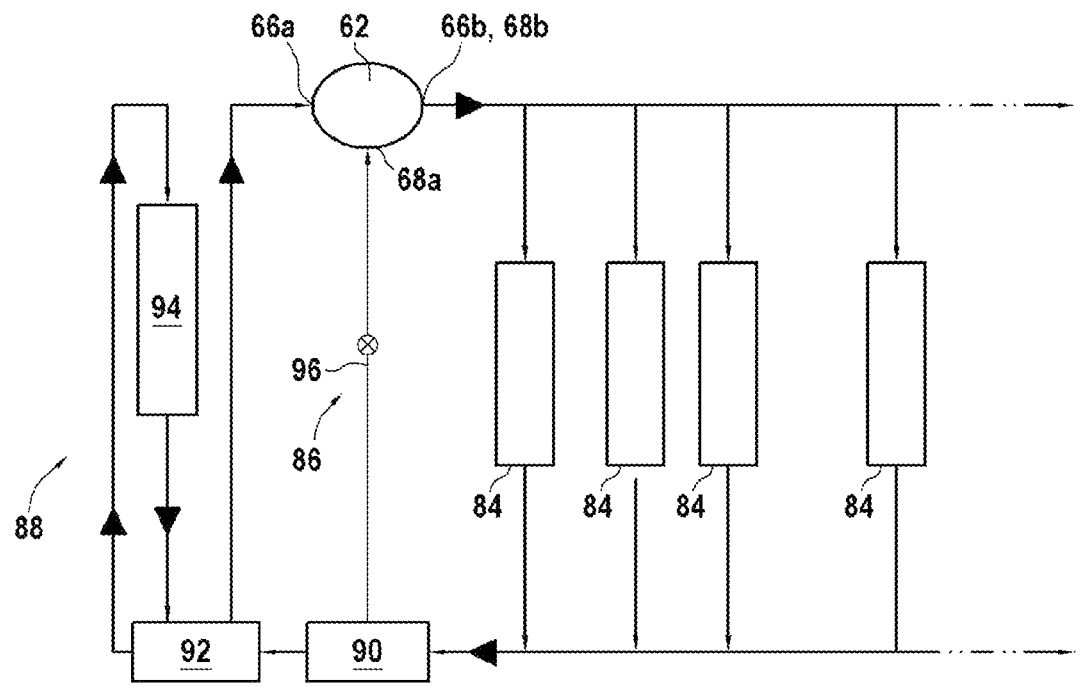
[Fig. 7]
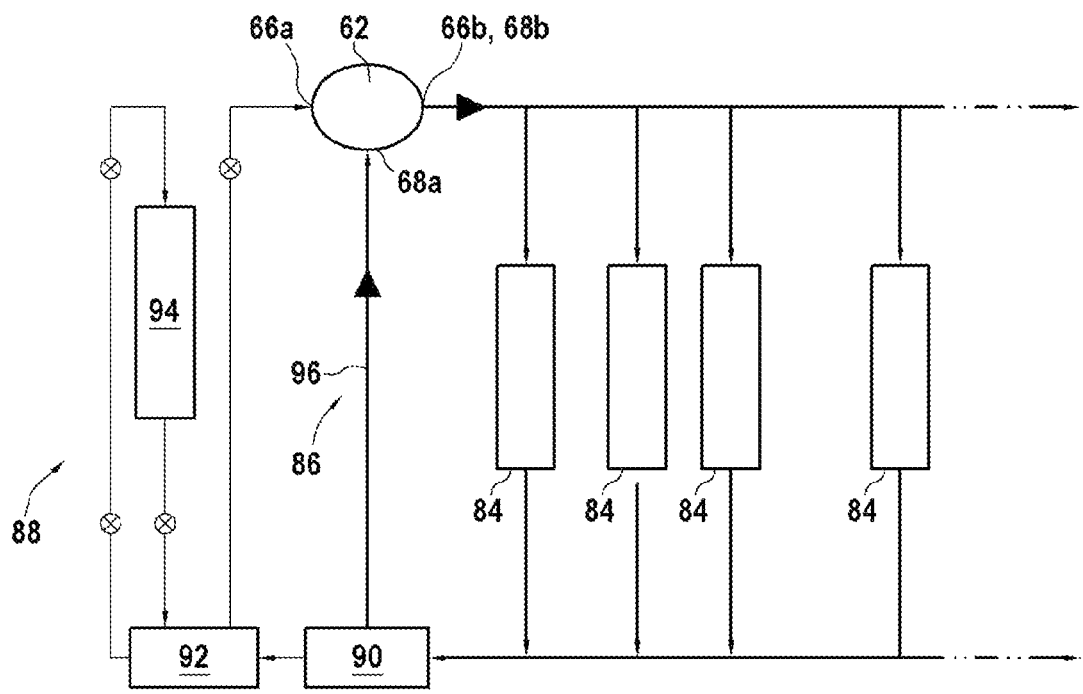

[Fig. 8]
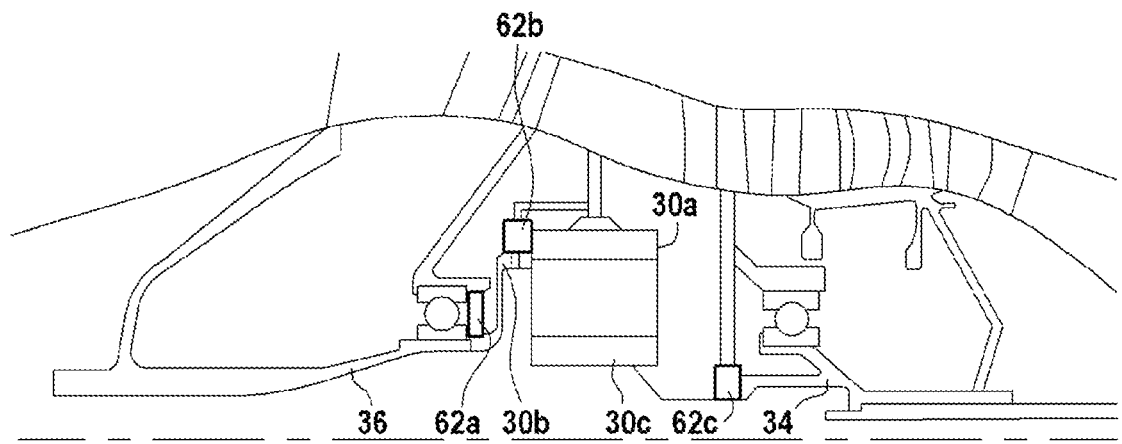
[Fig. 9]
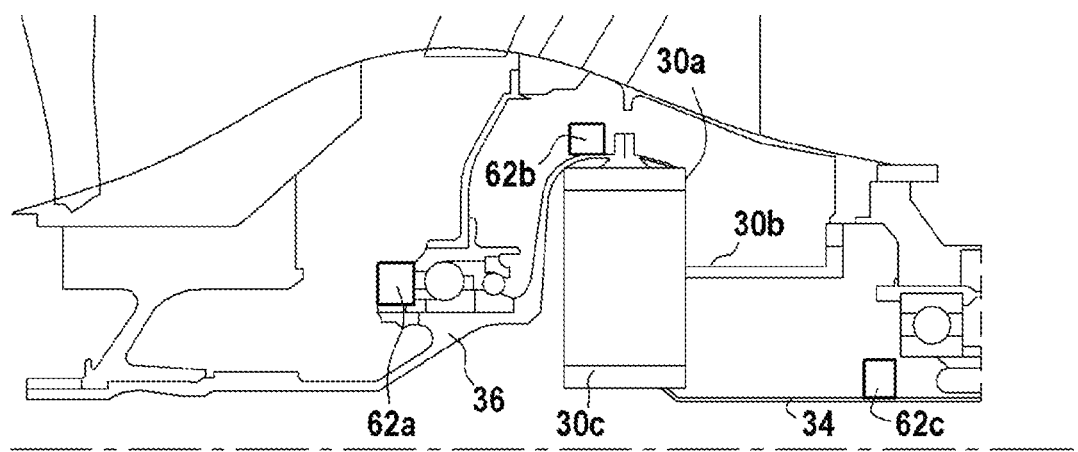

LUBRICATION MODULE FOR A TURBOMACHINE LUBRICATION STATION

This application claims benefit from the French Patent Application No. 2205930, filed on Jun. 17, 2022.

TECHNICAL FIELD

The present disclosure relates to the supply of lubricant to a lubrication station of a turbomachine, particularly an aircraft turbomachine.

BACKGROUND

An aircraft dual-spool turbofan engine conventionally comprises a low-pressure spool comprising a low-pressure shaft and a high-pressure spool comprising a high-pressure shaft. The low-pressure and high-pressure shafts extend coaxially along a longitudinal axis of the turbomachine.

Such a turbomachine further comprises a fan which is driven by the low-pressure shaft either directly or via a planetary or epicyclic reduction gear, as described in document FR2817912.

The reduction gear as well as the rollings or bearings need a lubricant supply to lubricate and cool the gears, splines, rollings and bearings.

In normal operation of the turbomachine, the lubricant supply is ensured by a main lubrication circuit comprising a pump mechanically driven by a transmission box coupled to the high-pressure shaft, commonly called AGB (Accessory Gear Box).

In the non-operational mode of the turbomachine, whether in the case of a shutdown of the turbomachine in flight or in the event of immobilization of the aircraft on the ground with the turbomachine switched off, a windmill of the fan can occur under the action of the wind. The fan is called windmilling fan.

The same applies when the turbomachine is at low speed.

In both cases, the high-pressure shaft is stopped or running at too low a speed to allow the pump, supplied by the AGB gear box, to provide the lubricant flow rate required in the main lubrication circuit.

In order to overcome this problem, document FR3020410 proposes to deliver additional mechanical power to the AGB gear box, to drive the pump, by means of an auxiliary mechanical drawing from the fan during this event.

In practice, in the event of windmilling of the fan on the ground, the fan is likely to be driven in one direction or the other depending on the direction of propagation of the wind. However, the AGB gear box is conventionally designed to drive the axis of the pump in rotation according to its useful direction of operation in the case of a drawing from the high-pressure shaft. It follows that drawing mechanical power from the fan requires the introduction of a complex kinematic chain difficult to integrate, aimed at making it possible to use a rotation of the fan in the opposite direction to the conventional direction of rotation of the high-pressure shaft.

The aim of the present disclosure is to propose a simple solution making it possible to ensure the lubrication of the reduction gear regardless of the direction of rotation of the fan.

SUMMARY

To this end, the present disclosure relates to a lubrication module for at least one lubrication station of a turbomachine, the lubrication module comprising at least one positive displacement pump including a pump body delimiting a main chamber configured to be in fluid communication with a main lubrication circuit and an auxiliary chamber configured to be in fluid communication with an auxiliary lubrication circuit, and a piston movably mounted in the pump body between an inactive configuration and an active configuration, the piston being configured to perform, in the active configuration, a pumping movement between a top dead center and a bottom dead center by cooperation with a cam of a shaft of the turbomachine and, in the inactive configuration, not to cooperate with the cam of the shaft of the turbomachine, the positive displacement pump including a return element configured to return the piston to the active configuration and the piston extending into the main chamber so that the filling of the main chamber with lubricating fluid beyond a predetermined threshold brings the piston into the inactive configuration.

The lubrication module is provided to supply a lubrication station with lubricant (or lubricating fluid, or more generally fluid), the lubrication station having the function of distributing the lubricant at the level of a member of the turbomachine to be lubricated. The lubrication module may supply one or more lubrication stations, these lubrication stations then belonging both to the main lubrication circuit and to the auxiliary lubrication circuit.

The lubrication module comprises at least one positive displacement pump. Thereafter, and unless otherwise specified, by "a" or "the" element (for example positive displacement pump, lubrication station, etc.), it is meant "at least one" or "the at least one" or "each" element. Conversely, the generic use of the plural may include the singular.

The positive displacement pump comprises a pump body and a piston. The pump body defines a main chamber and an auxiliary chamber in each of which the piston extends.

Thus, in normal operation of the turbomachine, the flow rate of the lubricating fluid is ensured by a lubrication pump of the main lubrication circuit, this pump being powered, for example, by the AGB. This pump is dimensioned so that the flow rate of lubricating fluid is then such that the main fluid chamber is filled beyond a predetermined threshold, which results in the piston being in the inactive configuration. The lubrication is therefore ensured by the main circuit, via the main chamber of the positive displacement pump. Particularly, the pressure in the main chamber may be sufficient to overcome the force of the return element which tends to return the piston to the active configuration.

Conversely, when the flow rate of the lubricating fluid, and therefore the filling of the main chamber with lubricating fluid, is below the predetermined threshold, the piston, under the action of the return element, is returned to the active configuration. In this active configuration, the piston performs a pumping movement between a top dead center and a bottom dead center by cooperation with the cam of a shaft of the turbomachine. This pumping movement allows the lubricating fluid supply by pumping of the lubricating fluid into the circuit, via the auxiliary chamber.

The main chamber therefore forms an activation chamber for the positive displacement pump, whose filling determines whether the piston is in the active configuration or in the inactive configuration.

In the active configuration, the combination of the cam and of the piston makes it possible to transform a rotational movement of the shaft of the turbomachine into a pumping movement of the piston in the pump body, which allows the lubricating fluid supply that the shaft of the turbomachine rotates in one direction or the other. The pumping movement may be a translational movement of the piston in the pump body.

Furthermore, thanks to the fact that the same positive displacement pump manages, via the main chamber and the auxiliary chamber, the supply of lubricant to the lubrication station in all operating conditions of the turbomachine, it is possible to better control the lubricant flow rate to the lubrication station.

In some embodiments, in the active configuration, the piston is configured to pump the fluid through the auxiliary chamber. The pumping movement may therefore be a back and forth movement of the piston in the auxiliary chamber.

In some embodiments, the active configuration corresponds to a phase of windmilling of a fan of the turbomachine or to a phase of idle rotation of the turbomachine. When the turbomachine is stopped or when the turbomachine is idling (ground idle), the high-pressure shaft is stopped or rotates at too low a speed to allow the main circuit to provide the required lubricant flow rate.

In some embodiments, the lubrication module comprises an intermediate tank disposed on the auxiliary lubrication circuit, between the lubrication station and the positive displacement pump in the direction of circulation of the lubricating fluid. In other words, the intermediate tank is downstream of the lubrication station and upstream of the positive displacement pump, the terms "upstream" and "downstream" being defined with respect to the normal direction of circulation of the fluid. The intermediate tank therefore ensures a more regular supply to the auxiliary chamber of the positive displacement pump.

In some embodiments, the intermediate tank is disposed between the lubrication station and a pump of the main lubrication circuit in the direction of circulation of the lubricating fluid. In other words, the intermediate tank is downstream of the lubrication station and upstream of the pump of the main lubrication circuit. The intermediate tank therefore ensures a more regular supply to the main chamber of the positive displacement pump.

More generally, the intermediate tank may be common to the main lubrication circuit and to the auxiliary lubrication circuit.

In some embodiments, the piston is configured to prevent, in the inactive configuration, the circulation of fluid through the auxiliary chamber. For example, the piston may, in the inactive configuration, obturate the inlet and/or the outlet of the auxiliary chamber, or be interposed between the inlet and the outlet of the auxiliary chamber. Thus, in the inactive configuration, the auxiliary lubrication circuit is interrupted. In these embodiments, in the normal operation of the turbomachine, only the main lubrication circuit supplies the lubrication station, which ensures the control of the lubrication flow rate.

In some embodiments, the piston is configured to prevent, in the active configuration, the circulation of fluid through the main chamber. For example, the piston may, in the active configuration, obturate the inlet and/or the outlet of the main chamber, or be interposed between the inlet and the outlet of the main chamber. Thus, in the inactive configuration, the main lubrication circuit is interrupted. For example, the inlet and the outlet of the main chamber may be disposed so that the piston remains between the inlet and the outlet during its entire stroke between the top dead center and the bottom dead center. In these embodiments, in non-operational mode of the turbomachine, only the auxiliary lubrication circuit supplies the lubrication station, which ensures the control of the lubrication flow rate.

In some embodiments, the auxiliary chamber has a volume smaller than the volume of the main chamber. The volume designates the internal volume of the chamber, accessible to the lubricating fluid. This allows better accuracy on the dimensioning of the predetermined threshold in the main chamber. Moreover, in non-operational mode of the turbomachine, a lower lubricant flow rate than in normal operation is provided, in order to better correspond to the actual lubrication needs.

In some embodiments, in the inactive configuration, the piston is stowed beyond the top dead center and the bottom dead center so as to be at a distance from the cam. Thus, the position of the piston in the inactive configuration may be located in the extension of the pumping movement, but beyond the top and bottom dead centers so that the piston no longer cooperates with the cam, typically by being at a distance from the cam. The construction of the positive displacement pump allowing the active and inactive configurations of the piston is therefore particularly simple.

The present disclosure also relates to a lubrication assembly comprising a lubrication module as previously described and a cam configured to be mounted on a turbomachine shaft and to cooperate with the piston of the lubrication module.

In some embodiments, the cam comprises at least three top centers and three bottom centers. For example, each top center corresponds to the top dead center of the piston and each bottom center corresponds to the bottom dead center of the piston. The cam therefore comprises an alternation of top and bottom dead centers, whose number can be dimensioned according to the desired back-and-forth frequency for the piston, therefore according to the desired pumping flow rate in the active configuration.

The present disclosure also concerns an aircraft turbomachine comprising at least one shaft and at least one lubrication assembly as described above, whose cam is secured in rotation to the at least one shaft. Thus, the shaft and the cam rotate together. The cam may be provided as a distinct piece of the shaft and assembled to the shaft, or formed by machining of the shaft.

In some embodiments, the turbomachine comprises at least three positive displacement pumps, the three positive displacement pumps being disposed in phase shift around the shaft. Each positive displacement pump may have the aforementioned characteristics. The phase shift means that the pistons of the positive displacement pumps are, at a given instant, at different positions. The phase shift may be obtained in several ways, alternative to each other or complementary to each other, for example: arrangement of the positive displacement pumps around the same cam, at angular positions which do not correspond to a period of the cam; arrangement of the positive displacement pumps around different cams, these cams being in phase shift relative to each other. The fact of providing at least three positive displacement pumps in phase shift and which supply the same auxiliary circuit allows smoothing the lubricant flow rate in this auxiliary circuit, in order to make it more regular.

In some embodiments, the shaft is a shaft of a reduction gear of the turbomachine.

BRIEF DESCRIPTION OF THE DRAWINGS

Other features and advantages of the object of the present disclosure will emerge from the following description of embodiments, given by way of non-limiting examples, with reference to the appended figures.

FIG. 1 is a schematic longitudinal half-sectional view of a turbomachine.

FIG. 2 illustrates, in perspective and cut out view, a lubrication assembly according to one embodiment.

FIG. 3 is a front view, in cross section along the plane III-III of FIG. 2, of a lubrication assembly according to one embodiment, when the piston is in the inactive configuration.

FIG. 4 is a front view, in cross section along the plane III-III of FIG. 2, of the lubrication assembly of FIG. 3, when the piston is in the active configuration and at the bottom dead center.

FIG. 5 is a front view, in cross section according to the plane III-III of FIG. 2, of the lubrication assembly of FIG. 3, when the piston is in the active configuration and at the top dead center.

FIG. 6 schematically illustrates the lubrication in a turbomachine when the main lubrication circuit is operational.

FIG. 7 schematically illustrates the lubrication in a turbomachine when the auxiliary lubrication circuit is operational.

FIG. 8 is an axial sectional part of a turbomachine comprising an epicyclic reduction gear.

FIG. 9 is an axial sectional part of a turbomachine comprising a planetary reduction gear.

DETAILED DESCRIPTION

A turbomachine 10 for an aircraft according to one embodiment is schematically represented in FIG. 1, in partial longitudinal half-section. In this case, the turbomachine 10 is a two-spool, dual-flow turbojet engine. Indeed, the turbomachine 10 comprises a thruster 12, in this case a fan, preferably a single fan, an inner casing 14 disposed downstream of the thruster 12 and separating a primary flowpath 16 from a secondary flowpath 18. A low-pressure compressor (LP compressor) 20, a high-pressure compressor (HP compressor) 22, a combustion chamber 24, a high-pressure turbine (HP turbine) 26 and a low-pressure turbine (LP turbine) 28 are arranged in the primary flowpath 16, from the upstream to downstream. Because the turbomachine 10 is a dual-spool turbomachine, it includes two kinematically independent rotating assemblies, namely on the one hand a high-pressure spool (HP spool), comprising the HP compressor 22 and the HP turbine 26, and on the other hand a low-pressure spool (LP spool) comprising the LP compressor 20 and the LP turbine 28. Each compressor 20, 22 is directly or indirectly driven by the turbine 26, 28 of the corresponding spool, the turbines 26, 28 being set in motion by the combustion gases derived from the combustion chamber 24.

However, the present disclosure can be transposed to the case of a single-spool turbomachine. The single spool would have the function of the HP spool for the operation of the turbomachine, but its role with respect to the reduction gear 30 described below would be that of the LP spool. Furthermore, the present disclosure can be transposed to the case where the thruster 12 is not a fan but a propeller.

The casing 14 is fixed in the reference frame of the turbomachine and a fortiori of the aircraft, and the rotating parts, namely the movable bladed wheels of the thruster 12, of the compressors 20, 22 and of the turbines 26, 28, rotate relative to the casing 14.

The rotation of the HP turbine 26 drives the HP compressor 22 via a HP shaft 32. The HP compressor 22 and the HP turbine 26 are therefore kinematically dependent on each other and, particularly here, rotate at the same speed. The HP shaft 32 may be supported relative to the casing by at least one bearing, for example a first bearing, typically a ball bearing, relative to the casing and a second bearing, typically a roller bearing, relative to the casing.

Moreover, in this embodiment, the LP turbine 28 drives in rotation the LP compressor 20. The LP turbine 28 also drives in rotation the thruster 12. More specifically, the turbomachine 10 comprises a transmission, here a reduction gear 30, coupled to the LP turbine 28 via a LP turbine shaft 34 and to the thruster 12 via a thruster shaft 36. In this embodiment, the LP turbine shaft 34 is arranged coaxially inside the HP shaft 32. Bearings 38 may be provided to support the LP turbine shaft 34 and/or the thruster shaft 36.

Thus, as illustrated in FIG. 1, the reduction gear 30 is coupled to the thruster 12 and to the LP compressor 20 in order to modify the rotation speed transmission ratio between the LP turbine 28, and on the one hand the thruster 12 and on the other hand the LP compressor 20.

The reduction gear 30 but also other members such as the aforementioned bearings, require lubrication. To this end, according to one embodiment, the turbomachine 10 comprises at least one lubrication assembly 50, as illustrated in FIG. 2. The lubrication assembly 50 comprises a cam 52 mounted on a shaft of the turbomachine 10, in this case the thruster shaft 36. The cam 52 may be a part distinct from the thruster shaft 36 or integrated into the thruster shaft 36, typically formed by a non-circular section of the thruster shaft 36. In these different examples, the cam 52 is secured in rotation to the thruster shaft 36.

The lubrication assembly 50 moreover comprises a lubrication module 60 which is represented in more detail in the following figures.

FIG. 3 illustrates in cross section the lubrication module 60 according to one embodiment.

As indicated above, the lubrication module 60 comprises at least one positive displacement pump 62 comprising a pump body 64 and a piston 70 movably mounted in the pump body 64. For example, the piston 70 may be movable in translation along one longitudinal direction A-A, which may be the direction in which the pump body 64 extends. In this case, the longitudinal direction A-A corresponds to a radial direction of the turbomachine 10. The pump body 64 may be fixed relative to the turbomachine as a whole, for example fixed relative to the casing 14.

The pump body 64 defines a main chamber 66 configured to be in fluid communication with a main lubrication circuit which will be described later. For this purpose, the main chamber 66 may be provided with an inlet orifice 66a and an outlet orifice 66b. The inlet orifice 66a and the outlet orifice 66b may be provided at different positions along the longitudinal direction A-A.

The piston 70 extends in the main chamber 66. For example, the piston 70 may comprise a longitudinal rod 72, and a main disc 76, secured in translation to the rod 72 and configured to longitudinally slide in the main chamber 66. In section, the disc 76 follows the shape of the main chamber 66.

Moreover, the pump body 64 defines an auxiliary chamber 68, more visible in FIG. 4. The auxiliary chamber 68 is configured to be in fluid communication with an auxiliary lubrication circuit which will be described later. For this purpose, the auxiliary chamber 68 may be provided with an intake orifice 68a and a discharge orifice 68b. The intake orifice 68a and the discharge orifice 68b may be provided at different positions along the longitudinal direction A-A. Furthermore, as illustrated, the intake orifice 68a and/or the discharge orifice 68b may be provided with check valves in order to constrain the direction of circulation of the fluid from the intake orifice 68a to the auxiliary chamber 68 and/or from the auxiliary chamber 68 to the discharge orifice 68b, respectively.

The piston 70 extends into the auxiliary chamber 68. For example, the piston 70 may comprise an auxiliary disc similar to the main disc 76, secured in translation to the rod 72 and configured to slide longitudinally in the auxiliary chamber 68. Alternatively, as illustrated in FIGS. 3 and 4, the auxiliary chamber 68 may be dimensioned so as to match the section of the rod 72 at one end 78 thereof. In other words, in the illustrated embodiment, the end 78 of the rod 72 itself acts as an auxiliary disc.

The opposite end of the piston 70, that is to say here on the side of the cam 52, forms a drive portion 74.

In this embodiment, the auxiliary chamber 68 has a volume smaller than the volume of the main chamber 66. However, other configurations are envisaged.

Moreover, the positive displacement pump 62 comprises a return element 80. The return element 80 may be a spring, typically mounted in compression or in tension, or any other element able to exert a return force (magnetic system, elastic element, etc.). The return element 80 is here provided in a dedicated cavity 82 of the pump body 64. The return element 80 is configured to return the piston 70, for example by bearing on the one hand on a wall of the cavity 82, on the other hand on part of the piston such as a flange 72a. Other assemblies are of course possible: for example, the return element could be mounted in compression between the drive portion 74 and the bottom of the corresponding bore of the pump body 64, without a dedicated cavity 82.

In this embodiment, the return element 80 is provided to return the piston 70 towards the cam 52 that is to say downwards in the orientation of FIG. 3.

Although the main chamber 66, the cavity 82 and the auxiliary chamber 68 are here provided aligned in this order along the longitudinal direction A-A, any other order or arrangement of these chambers and cavity can be envisaged.

In FIG. 3, the piston 70 is represented in a configuration called inactive configuration. In the inactive configuration, the piston 70 does not cooperate with the cam 52. Indeed, as can be seen in FIG. 3, the piston 70, and more particularly its drive portion 74, is at a distance from the cam 52. Moreover, in this inactive configuration, the piston 70, and more particularly the end 78, prevents the circulation of fluid through the auxiliary chamber 68, here by obturating the intake orifice 68a.

The piston 70 is maintained in the inactive configuration thanks to the fact that the main chamber 66 is filled with lubricating fluid beyond a predetermined threshold. To do so, the pressure of the lubricating fluid exerted on the main disc 76 overcomes the force of the return element 80 enough to move the piston 70 up to a center where it is no longer in contact with the cam 52. More generally, the return element 80 and the filling of the main chamber 66 exert, on the piston 70, antagonistic actions. In the inactive configuration, the inlet orifice 66a and the outlet orifice 66b of the main chamber 66 are on the same side of the disc 76, so that the fluid can flow from the inlet orifice 66a to the outlet orifice 66b through the main chamber 66. The predetermined filling threshold may correspond to the threshold from which the disc 76 allows the flow between the inlet orifice 66a and the outlet orifice 66b.

Conversely, the fact that the main chamber 66 is filled below the predetermined threshold reflects the fact that the pressure of the fluid on the main disc 76 is no longer sufficient to overcome the force of the return element 80, and the return element 80 returns the piston 70 to the cam 52, up to a center where the piston 70 cooperates with the cam 52. The piston 70 is then said to be in the active configuration. This configuration is illustrated in FIGS. 4 and 5.

The foregoing description therefore illustrates the fact that the piston 70 is movable, in the pump body 64, between an inactive configuration and an active configuration. Furthermore, the return element 80 returns the piston 70 to the active configuration.

In the active configuration, the piston 70 is configured to perform a pumping movement between a top dead center and a bottom dead center. Thus, the active configuration corresponds to an interval of positions of the piston 70, here along the longitudinal direction A-A.

FIG. 4 more particularly illustrates the situation where the piston 70 is at the bottom dead center. The drive portion 74 is in contact with the cam 52, and more particularly with a bottom center 54 of the cam 52. The contact between the drive portion 74 and the cam 52 may be direct, as illustrated, or indirect, for example via a rolling piece making it possible to limit the friction between the cam 52 and the drive portion 74.

In this case, the cam 52 comprises on its external surface, in a section transverse to its axis of rotation, a succession of bottom centers 54 and top centers 56, the bottom centers 54 being closer to the axis of rotation of the cam 52 than the top centers 56. The external surface of the cam 52 passes, typically smoothly, from a bottom center 54 to a top center 56. In this case, the cam 52 comprises a plurality of radially protruding lobes (or more generally protruding in the longitudinal direction A-A), each lobe forming at its top a top center 56, while the recess between two successive lobes forms a bottom center 54. Although four lobes are represented in this case, corresponding to four bottom centers 54 and four top centers 56, any number of bottom centers 54 and top centers 56 can be envisaged, in particular at least two or even at least three bottom centers 54 and three top centers 56. Each bottom center 54 corresponds to the bottom dead center of the piston 70. Similarly, each top center 56 corresponds to the top dead center of piston 70, as will be explained with reference to FIG. 5.

Still referring to FIG. 4, when the piston 70 is at the bottom dead center, the end 78 no longer prevents the lubricating fluid from flowing into the auxiliary chamber 68. Indeed, the end 78 is below the intake orifice 68a. In other words, the intake orifice 68a and the discharge orifice 68b are on the same side of the end 78.

FIG. 5 more particularly illustrates the situation where the piston 70 is at the top dead center, following a rotation of the cam 52. The drive portion 74 is in contact with the cam 52, and more particularly with a top center 56 of the cam 52. The cam 52 thus pushes the piston 70 towards the pump body 64, against the force of the return element 80 which tends to maintain the piston 70 in contact with the cam 52.

Thus, in the active configuration, the piston 70 oscillates, by cooperation with the cam 52 and according to the rotation of the cam 52, between the bottom dead center (FIG. 4) and the top dead center (FIG. 5). This defines a pumping movement and makes the positive displacement pump 62 an oscillating positive displacement pump. When the piston 70 is at the bottom dead center, due to the check valves, a partial vacuum is created in the auxiliary chamber 68. The valve of the intake orifice 68a opens, letting pass the fluid sucked into the created space. Then, under the effect of the cam 52, the piston 70 is pushed back towards the top dead center. The space available to the fluid in the auxiliary chamber 68 is thereby reduced, the pressure increases, forcing the fluid to move. It is then the turn of the valve of the discharge orifice 68b to open to allow the discharge of the pumped lubricating fluid. In the active configuration, the piston 70 is therefore configured to pump the fluid through the auxiliary chamber 68.

As illustrated in FIGS. 4 and 5, in the active configuration, the piston 70 prevents the circulation of fluid through the main chamber 66. The top dead center and the bottom dead center may be dimensioned such that when the piston 70 is between the top dead center and the bottom dead center, the main disc 76 is between the inlet orifice 66a and the outlet orifice 66b, thus interrupting the circulation of fluid through the main chamber 66, even if that circulation is theoretically already weak or interrupted (otherwise the piston 70 would not be in the active configuration, for the reasons explained above).

It is apparent from FIGS. 3 to 5 that in the inactive configuration, the piston 70 is stowed beyond the top dead center and the bottom dead center so as to be at a distance from the cam 52. In this case, in the inactive configuration, the piston 70 is retracted further into the pump body 64 (that is to say further upwards in the orientation of FIGS. 3 to 5) than when it is in the active configuration.

FIGS. 6 and 7 schematically represent the integration of such a lubrication module into a turbomachine lubrication system.

FIG. 6 illustrates at least one lubrication station 84, in this case a plurality of such stations, typically in parallel to each other. These lubrication stations 84 are supplied with lubricant by a main lubrication circuit 86 and an auxiliary lubrication circuit 88.

In this embodiment, the lubrication module 50 comprises an intermediate tank 90. Each lubrication station 84 is connected to an outlet of the positive displacement pump 62, in this case both the outlet orifice 66b and the discharge orifice 68b (which are here combined in the diagram for the sake of clarity). Moreover, the lubricant recoveries on each of the lubrication stations 84 converge towards the intermediate tank 90. In this embodiment, the circuit part that extends from a common segment at the outlet of the outlet orifice 66b and the discharge orifice 68b, and up to and including the intermediate tank 90, is common to the main lubrication circuit 86 and to the auxiliary lubrication circuit 88.

The main lubrication circuit 86 also comprises a pump 92, driven by the turbomachine and configured to supply the main chamber 66 of the positive displacement pump 62, via the inlet orifice 66a. If necessary, a tank 94 may be provided on the main lubrication circuit 86.

The auxiliary lubrication circuit 88 comprises a duct 96 extending from the tank 90 to the intake orifice 68a.

Thus, the intermediate tank 90 is disposed on the auxiliary lubrication circuit 88, between the lubrication station 84 and the positive displacement pump 62 in the direction of circulation of the lubricating fluid. Moreover, the intermediate tank 90 is disposed between the lubrication station 84 and the pump 92 of the main lubrication circuit 86 in the direction of circulation of the lubricating fluid.

FIG. 6 illustrates the inactive configuration of the piston 70: the turbomachine has sufficient speed to power the pump 92, which therefore provides a flow rate and sufficient pressure to fill the main chamber 66 beyond the predetermined threshold. The lubrication stations 84 are therefore supplied, via the main chamber 66, with the lubricating fluid coming from the pump 92. Furthermore, as seen with reference to FIG. 3, the piston 70 prevents the circulation of fluid through the auxiliary chamber 68. As a result, no fluid flows through the duct 96.

FIG. 7 illustrates, conversely, the active configuration of the piston 70: the speed of the turbomachine is not sufficient to power the pump 92. In other words, the active configuration corresponds to a phase of windmilling of a fan of the turbomachine or to a phase of idle rotation of the turbomachine. Under these conditions, the pump 92 is substantially inactive, or at least its action does not allow supplying the lubrication stations 84 with lubricant. Its action therefore also does not make it possible to fill the main chamber 66 beyond the predetermined threshold. Consequently, it is the pumping movement of the piston 70, under the action of the windmilling or of the idling of the thruster 12, which generates a flow of lubricant in the duct 96, and therefore in the whole auxiliary lubrication circuit 88. The lubrication stations 84 are thus suitably supplied.

FIG. 8 illustrates several possible implantations of a positive displacement pump 62 in a turbomachine whose reduction gear 30 comprises an epicyclic gear train. In an epicyclic gear train, the ring gear 30a is fixed and the planet gear carrier 30b forms the outlet of the reduction gear 30. In this case, the planet gear carrier 30b is secured in rotation to the thruster shaft 36, while the sun gear 30c is secured in rotation to the LP turbine shaft 34.

As illustrated in FIG. 8, a positive displacement pump 62a may be arranged so as to cooperate with the thruster shaft 36 (or more exactly a cam provided on this shaft), a positive displacement pump 62b may be arranged so as to cooperate with the planet gear carrier 30b, and/or a positive displacement pump 62c may be arranged so as to cooperate with the shaft connecting the sun gear 30c to the turbine shaft 34. More generally, the shaft with which the positive displacement pump cooperates may be a shaft of the reduction gear 30 of the turbomachine 10.

The positive displacement pumps 62a, 62b and 62c may be provided as alternatives to each other or in addition to each other. In the case where several positive displacement pumps are present, for example at least three positive displacement pumps, said pumps may optionally be disposed in phase shift around the shaft(s). Even if the shafts do not all have the same rotation speed (for example the thruster shaft 36 normally rotates slower than the LP turbine shaft 34), their rotation speeds are in phase by virtue of the structure of the reduction gear 30. Thus, typically, the angular offset between two positive displacement pumps (or the corresponding cams, or the combination of the two), may be offset relative to a period of the fastest rotating shaft.

FIG. 9 illustrates several possible implantations of a positive displacement pump 62, similar to FIG. 8 but in the case where the reduction gear 30 comprises a planetary gear train. In a planetary gear train, the planet gear carrier 30b is fixed and the ring gear 30a forms the outlet of the reduction gear 30. In this case, the ring gear 30a is secured in rotation to the thruster shaft 36, while the sun gear 30c is secured in rotation to the LP turbine shaft 34.

As illustrated in FIG. 9, a positive displacement pump 62a may be arranged to cooperate with the thruster shaft 36 (or more exactly a cam provided on this shaft), a positive displacement pump 62b may be arranged so as to cooperate with the ring gear 30a, and/or a positive displacement pump 62c may be arranged so as to cooperate with the turbine shaft 34. More generally, the shaft with which the positive displacement pump cooperates may be a shaft of the reduction gear 30 of the turbomachine 10.

The other considerations relating to FIG. 8 apply mutatis mutandis to FIG. 9.

Although the present disclosure has been described with reference to one specific exemplary embodiment, it is obvious that various modifications and changes can be made to these examples without departing from the general scope of the invention. For example, although one embodiment has been described in which the longitudinal direction A-A corresponds to a radial direction of the turbomachine 10, other arrangements are possible: according to another example, the lubrication module 60 may be mounted so that the longitudinal direction A-A is parallel to an axial direction of the turbomachine 10. The lobes of the cam 52 may then protrude axially or more generally in the longitudinal direction. Other directions are still possible. Furthermore, individual characteristics of the different embodiments mentioned can be combined in additional embodiments. Accordingly, the description and drawings should be considered in an illustrative rather than restrictive sense.

The invention claimed is:

1. A lubrication module for at least one lubrication station of a turbomachine, the lubrication module comprising at least one positive displacement pump including a pump body delimiting a main chamber configured to be in fluid communication with a main lubrication circuit and an auxiliary chamber configured to be in fluid communication with an auxiliary lubrication circuit, and a piston movably mounted in the pump body between an inactive configuration and an active configuration, the piston being configured to perform, in the active configuration, a pumping movement between a top dead center and a bottom dead center by cooperation with a cam of a shaft of the turbomachine and, in the inactive configuration, not cooperate with the cam of the shaft of the turbomachine, the positive displacement pump including a return element configured to return the piston to the active configuration, and the piston extending into the main chamber so that the filling of the main chamber with lubricating fluid beyond a predetermined threshold brings the piston into the inactive configuration.

2. The lubrication module according to claim 1, wherein, in the active configuration, the piston is configured to pump the fluid through the auxiliary chamber.

3. The lubrication module according to claim 1, wherein the active configuration corresponds to a phase of windmilling of a fan of the turbomachine or to a phase of idle rotation of the turbomachine.

4. The lubrication module according to claim 1, comprising an intermediate tank disposed on the auxiliary lubrication circuit, between the lubrication station and the positive displacement pump in the direction of circulation of the lubricating fluid.

5. The lubrication module according to claim 4, wherein the intermediate tank is disposed between the lubrication station and a pump of the main lubrication circuit in the direction of circulation of the lubricating fluid.

6. The lubrication module according to claim 1, wherein the piston is configured to prevent, in the inactive configuration, the circulation of fluid through the auxiliary chamber.

7. The lubrication module according to claim 1, wherein the piston is configured to prevent, in the active configuration, the circulation of fluid through the main chamber.

8. The lubrication module according to claim 1, wherein the auxiliary chamber has a volume smaller than a volume of the main chamber.

9. The lubrication module according to claim 1, wherein, in the inactive configuration, the piston is stowed beyond the top dead center and the bottom dead center so as to be at a distance from the cam.

10. A lubrication assembly comprising the lubrication module according to claim 1 and a cam configured to be mounted on a turbomachine shaft and to cooperate with the piston of the lubrication module.

11. The lubrication assembly according to claim 10, wherein the cam comprises at least three top centers and three bottom centers, each top center corresponding to the top dead center of the piston and each bottom center corresponding to the bottom dead center of the piston.

12. An aircraft turbomachine comprising at least one shaft and at least one lubrication assembly according to claim 10, whose cam is secured in rotation to the at least one shaft.

13. The aircraft turbomachine according to claim 12, comprising at least three positive displacement pumps, the three positive displacement pumps being disposed in phase shift around the shaft.

14. The aircraft turbomachine according to claim 12, wherein the shaft is a shaft of a reduction gear of the turbomachine.

* * * * *